Nov. 4, 1924.
R. R. BEATTY
MAGNIFYING MIRROR
Filed Jan. 24, 1924
1,513,734
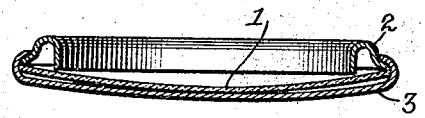
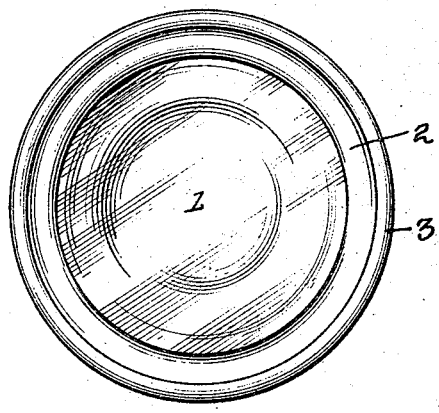
Raymond R. Beatty
INVENTOR
BY
Robert B. Killgore
ATTORNEY Patented Nov. 4, 1924.

1,513,734

UNITED STATES PATENT OFFICE.

RAYMOND R. BEATTY, OF BRONXVILLE, NEW YORK, ASSIGNOR TO FREDERICK F. INGRAM COMPANY, OF DETROIT, MICHIGAN, A CORPORATION OF MICHIGAN.

MAGNIFYING MIRROR.

Application filed January 24, 1924. Serial No. 688,197.

*To all whom it may concern:*

Be it known that I, RAYMOND R. BEATTY, a citizen of the United States, residing at Bronxville, in the county of Westchester and State of New York, have invented certain new and useful Improvements in Magnifying Mirrors, of which the following is a specification.

My invention relates to improvements in magnifying mirrors and it is my object to produce a small mirror which can be cheaply made, in which the reflecting surface will be protected from accidental breakage and which can be carried in the small vanity cases used by women.

In the drawing, which is an enlarged view of my improved mirror, Fig. 1 is a sectional view of my mirror and Fig. 2 is a front view thereof.

A circular, concave, magnifying mirror 1 is mounted in a frame consisting of a metal ring 2 and a back 3.

The ring 2, as shown in Fig. 1, has a down-turned inner part and a flanged outer part and is formed of stamped metal.

The back is formed of celluloid and, when the mirror 1 is laid on the ring 2, is formed over the outer flange of the ring by heat and pressure so that the mirror lies between the ring and the back and below the surface of the ring to protect it from breakage. As the mirror is substantially the same diameter as the flange of the ring the latter acts as a retainer.

By this construction I am enabled to produce a magnifying mirror so cheaply that it can be given away with toilet preparations, such as face creams, and used by the purchaser to observe the effects of the preparation on the skin.

I claim:—

A magnifying mirror comprising a concave mirror, a metal ring provided with a down-turned inner part and an outwardly extending flange, the mirror and ring being of substantially the same diameter, and a celluloid back having its edge turned over the ring flange with the mirror between the ring and back.

In testimony whereof I have affixed my signature.

RAYMOND R. BEATTY.